US012710168B1

(12) United States Patent
Zheng

(10) Patent No.: US 12,710,168 B1
(45) Date of Patent: Aug. 18, 2026

(54) LAMP PANEL STRUCTURE AND CEILING FAN LIGHT COMPRISING THE SAME

(71) Applicant: Hangzhou Juxing Intelligent Technology Co., Ltd., Hangzhou (CN)

(72) Inventor: Hongbing Zheng, Hangzhou (CN)

(73) Assignee: Hangzhou Juxing Intelligent Technology Co., Ltd., Hangzhou (CN)

(*) Notice: Subject to any disclaimer, the term of this patent is extended or adjusted under 35 U.S.C. 154(b) by 0 days.

(21) Appl. No.: 19/189,312

(22) Filed: Apr. 25, 2025

(30) Foreign Application Priority Data

Apr. 3, 2025 (CN) ........................ 202520631508.5

(51) Int. Cl.
*F21V 23/04* (2006.01)
*F21V 33/00* (2006.01)

(52) U.S. Cl.
CPC .......... *F21V 23/04* (2013.01); *F21V 33/0096* (2013.01)

(58) Field of Classification Search
CPC ...... F21V 23/04; F21V 33/0096; F21V 21/03; F21V 23/001; F04D 25/088; H02G 3/20; H02P 7/05; H02K 5/225; H02K 11/28; H02K 11/0094; H01H 17/14
See application file for complete search history.

(56) References Cited

U.S. PATENT DOCUMENTS 6,062,816 A * 5/2000 Chang .................. F04D 25/088 403/337
2013/0135866 A1* 5/2013 Souvay .................. F21V 29/83 362/249.02
2017/0321878 A1* 11/2017 Yao ........................ F21V 29/77

FOREIGN PATENT DOCUMENTS

KR 20090054982 A * 6/2009 ......... H05K 7/20918

OTHER PUBLICATIONS

SEARCH English translation of KR 20090054982 A (Year: 2009).*

* cited by examiner

*Primary Examiner* — Omar Rojas Cadima
(74) *Attorney, Agent, or Firm* — IPRTOP LLC

(57) ABSTRACT

Provided is a lamp panel structure and a ceiling fan light comprising the same. The lamp panel structure includes a lamp panel, pull-chain assemblies, a controller, a lamp board, and a lamp shade. The lamp panel is configured to fixedly mount the controller, the lamp board, and the lamp shade, respectively. A sidewall structure is integrally formed upward along a periphery of the lamp panel. The sidewall structure is fixedly connected to the pull-chain assemblies. The controller is fixedly mounted atop the lamp panel. Pull-chains of the pull-chain assemblies pass through the sidewall structure and connect to the controller, so that the pull-chains separately control a light switch and a fan switch. The lamp panel structure features an integrated design, eliminating the need for additional connection of two pull-chain wires and lamp board wires, enabling convenient installation while providing high structural integrity.

7 Claims, 4 Drawing Sheets

LAMP PANEL STRUCTURE AND CEILING FAN LIGHT COMPRISING THE SAME

FIELD OF TECHNOLOGY

The present disclosure relates to the technical field of fans, and in particular to a lamp panel structure and a ceiling fan light comprising the same.

BACKGROUND

As a common household appliance, a ceiling fan light integrates the functions of a lighting fixture and a fan. It can not only provide indoor lighting but also has heat dissipation performance. Therefore, the ceiling fan light is widely used in interior decoration.

At present, the controller of a pull-chain ceiling fan light on the market is typically installed above the lamp, while the pull-chain switch is installed below. This layout has the following drawbacks in practical use.

1. Complicated installation: Since the controller and the pull-chain switch are installed separately, mounting requires independent fixing and wiring, increasing installation difficulty.

2. High failure rate: The pull-chain is prone to wear or jamming after prolonged use, and the control module's elevated position makes troubleshooting and maintenance inconvenient.

3. Inconvenient replacement: If the pull-chain is damaged or the controller fails, the replacement process is complicated, negatively impacting user experience.

Therefore, the existing control structure of ceiling fan lights still requires optimization to improve installation convenience, reduce failure rates, and facilitate maintenance and replacement.

SUMMARY

The present disclosure provides a lamp panel structure and a ceiling fan light comprising the same, which can solve the problems in the traditional pull-chain ceiling fan light structure, including complicated installation, high failure rate, inconvenient replacement, etc.

In the first aspect, the present disclosure provides a lamp panel structure. The lamp panel structure includes a lamp panel, pull-chain assemblies, a controller, a lamp board, and a lamp shade. The lamp panel is configured to fixedly mount the controller, the lamp board, and the lamp shade, respectively. A sidewall structure is integrally formed upward along a periphery of the lamp panel. The sidewall structure is fixedly connected to the pull-chain assemblies. The controller is fixedly mounted atop the lamp panel. Pull-chains of the pull-chain assemblies pass through the sidewall structure and connect to the controller, so that the pull-chains separately control a light switch and a fan switch.

In one embodiment, at least one pull-chain hole is provided at an edge of the sidewall structure. The pull-chain assemblies match the pull-chain hole and are fixedly disposed on an exterior side of the sidewall structure.

In one embodiment, at least two pull-chain holes are provided.

In one embodiment, the top of the lamp panel is provided with a plurality of protrusions. The controller is fixedly mounted to the top of the lamp panel via the plurality of protrusions.

In one embodiment, the plurality of protrusions are all disposed on the same surface atop the lamp panel.

In one embodiment, the bottom of the controller and the top of the lamp panel form a suspended space via the plurality of protrusions.

In one embodiment, the lamp board is fixedly mounted below the lamp panel via connecting pieces and adheres to a lower surface of the lamp panel.

In one embodiment, the lamp shade is fixedly connected to a bottom of the lamp panel through connecting pieces.

In one embodiment, the lamp panel, the controller, and the pull-chain assemblies form an integrated structure.

In a second aspect, the present disclosure provides a ceiling fan light, comprising any one of the lamp panel structures as described above.

The present disclosure provides a lamp panel structure and a ceiling fan light comprising the same, which have the following beneficial effects.

(1) The lamp panel structure of the present disclosure features an integrated structure combining the pull-chains and lamp panel, which avoids wire entanglement issues. During user operation, the force is borne by the lamp panel, ensuring overall structural strength. The integration of the controller and pull-chains prevents abnormal issues such as signal wire breakage, while their co-location reduces signal wire length and saves costs. The integration of the controller and the lamp panel enhances signal strength, eliminates signal instability problems, and facilitates maintenance and replacement as the controller is mounted below as part of the integrated lamp panel structure.

(2) The lamp panel structure of the present disclosure features an integrated design combining a controller, pull-chains, and lamp panel. This structure eliminates the need for additional connection of two pull-chain wires and lamp board wires, enabling convenient installation while providing high structural integrity. It prevents various abnormal issues caused by excessive installation components and transportation impacts. Furthermore, this design significantly extends the service life of the ceiling fan light. This innovative approach not only solves the high failure rate problems of conventional ceiling fan lights, but also addresses safety concerns during installation, maintenance, and operation. Additionally, the structure and components of the ceiling fan light exhibit strong compatibility and broad applicability.

REFERENCE NUMERALS

Figure 1:
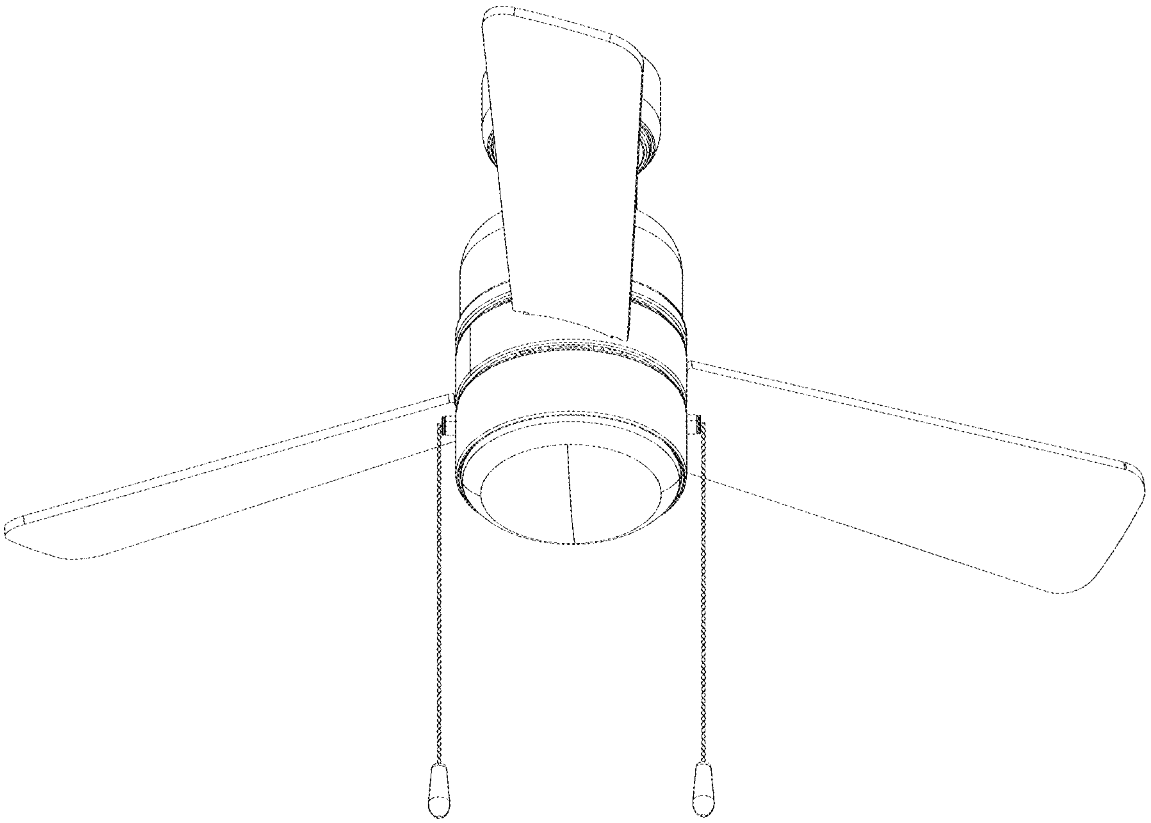
FIG. 1 is a bottom perspective view of a three-dimensional appearance structure of a ceiling fan light according to an embodiment of the present disclosure.

1 Lamp panel structure
11 Lamp panel

12 Controller
13 Pull-chain assembly
14 Lamp board
15 Lamp shade
111 Sidewall structure
112 Protrusion
113 Pull-chain hole
113A First pull-chain hole
113B Second pull-chain hole
131 Pull-chain fastener
131A First pull-chain fastener
131B Second pull-chain fastener
132 Pull-chain
132A First pull-chain
132B Second pull-chain
2 Motor assembly

DETAILED DESCRIPTION

The present disclosure will be described more fully hereinafter with reference to the accompanying drawings, but the protection scope of the present disclosure is not limited to the following description.

The embodiments of the present disclosure will be described below. Those skilled can easily understand other advantages and effects of the present disclosure according to the contents disclosed by the specification. The present disclosure can also be implemented or applied through other specific embodiments. Various modifications or changes in light of the embodiments will be suggested to persons skilled in the art and are to be included within the purview of this application. It needs to be stated that the following embodiments and the features in the embodiments can be combined with one another if no conflict results.

It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation. During the actual implementation, the type, quantity, and proportion of each component can be changed as needed, and the layout of the components can also be more complicated.

The following embodiments of the present disclosure provide a lamp panel structure and a ceiling fan light comprising the same, which can solve the technical problems in the traditional pull-chain ceiling fan light structure, including complicated installation, high failure rate, and inconvenient replacement.

The embodiments of the present disclosure provide a lamp panel structure and a ceiling fan light comprising the same. The lamp panel structure features an integrated design combining a controller, pull-chains, and lamp panel. This structure eliminates the need for additional connection of two pull-chain wires and lamp board wires, enabling convenient installation while providing high structural integrity. It prevents various abnormal issues caused by excessive installation components and transportation impacts. Furthermore, this design significantly extends the service life of the ceiling fan light. This innovative approach not only solves the high failure rate problems of conventional ceiling fan lights, but also addresses safety concerns during installation, maintenance, and operation.

The embodiments of the lamp panel structure and the ceiling fan light comprising the same will be described in detail below with reference to the accompanying drawings.

Figure 2:
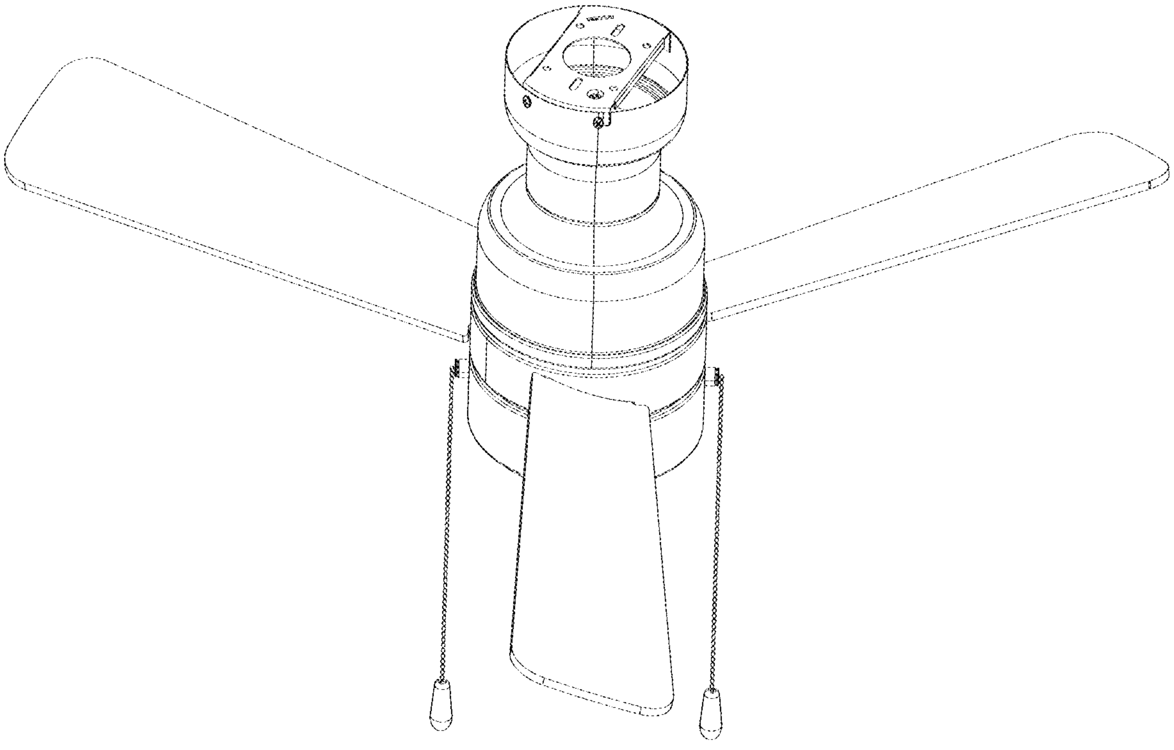
FIG. 2 is a top perspective view of a three-dimensional appearance structure of a ceiling fan light according to an embodiment of the present disclosure.
Figure 3:
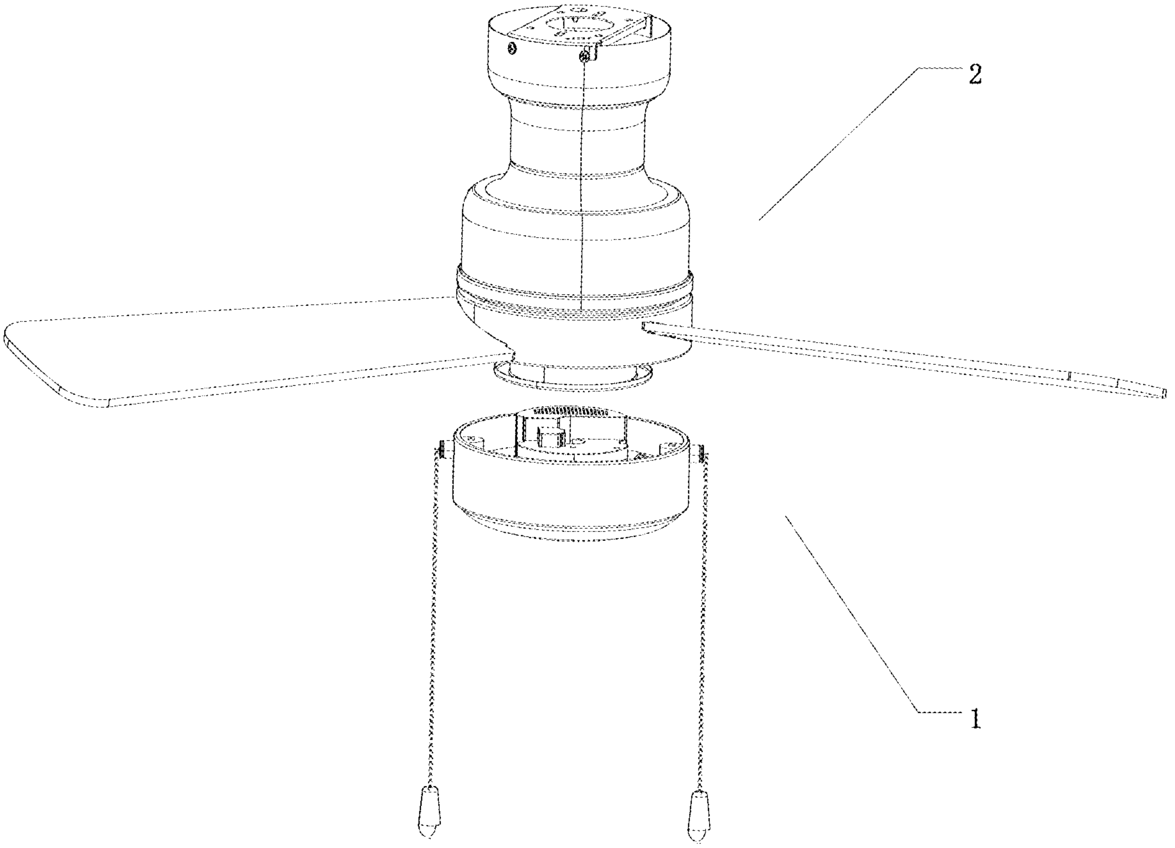
FIG. 3 is an exploded view showing a ceiling fan light product according to an embodiment of the present disclosure.
Figure 4:
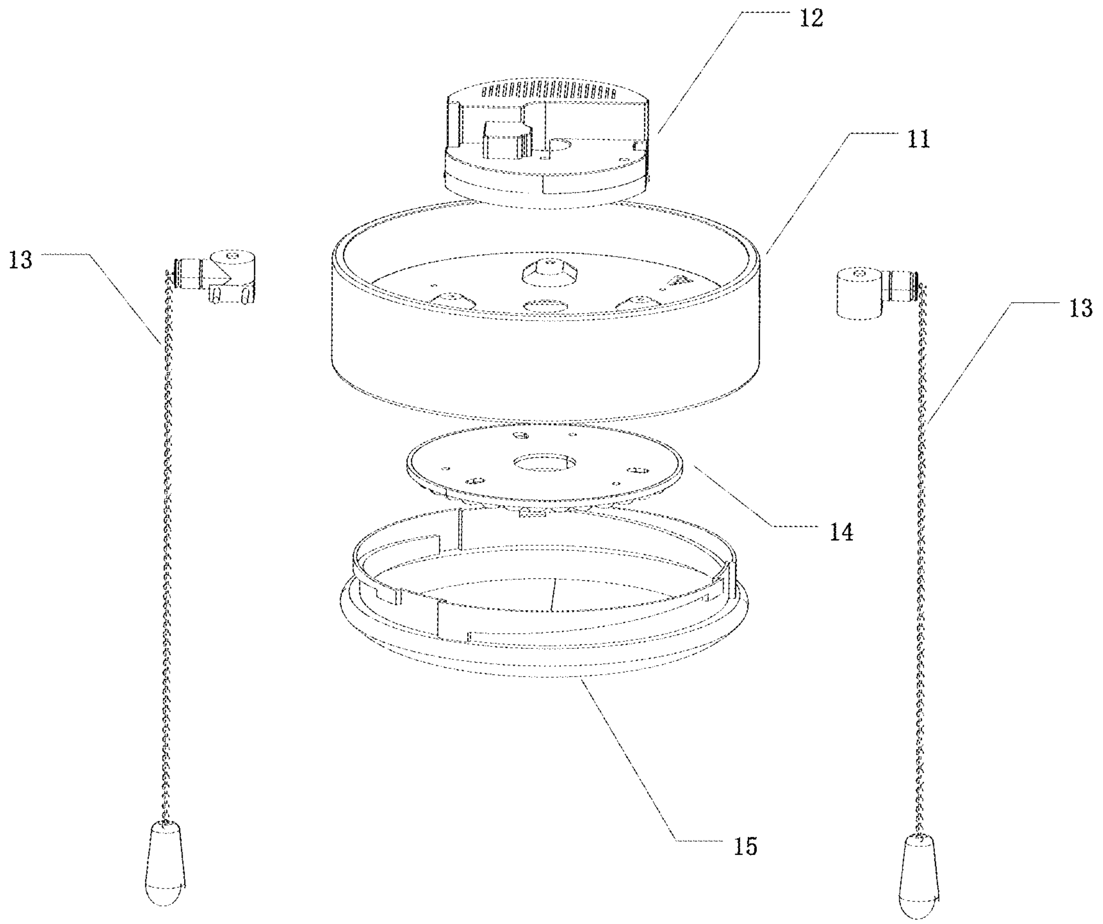
FIG. 4 is an exploded view showing a lamp panel structure according to an embodiment of the present disclosure.

Please refer to FIGS. 1 to 4. FIG. 1 and FIG. 2 show a bottom view and a top view of a three-dimensional appearance structure of a ceiling fan light according to an embodiment of the present disclosure, respectively. FIG. 3 shows an exploded view of a ceiling fan light product according to an embodiment of the present disclosure. FIG. 4 shows an exploded view of a lamp panel structure according to an embodiment of the present disclosure. As shown in FIGS. 1 to 4, the ceiling fan light includes a lamp panel structure 1 and a motor assembly 2.

In one embodiment, the present disclosure provides a ceiling fan light integrating a controller, pull-chains, and a lamp panel, comprising the lamp panel structure 1 and the motor assembly 2. The lamp panel structure 1 includes a lamp panel 11, pull-chain assemblies 13, a controller 12, a lamp board 14, and a lamp shade 15. Each of the pull-chain assemblies 13 includes a pull-chain fastener 131 and a pull-chain 132.

Specifically, the lamp panel 11 is configured to fixedly mount the controller 12, the lamp board 14, and the lamp shade 15, respectively. The controller 12, the pull-chain assemblies 13, and the lamp panel 11 are of an integrated structure design.

Furthermore, an upward sidewall structure 111 is integrally formed on a periphery of the lamp panel 11. The sidewall structure 111 is fixedly connected to the pull-chain assemblies 13. At least two pull-chain holes 113 are disposed at an edge of the sidewall structure 111. The pull-chain assemblies 13 match the pull-chain hole 113 and are fixedly disposed on the exterior side of the sidewall structure 111. Therefore, the periphery of the lamp panel 11 is provided with the upward sidewall structure, which can provide shielding and aesthetic effects after installation. The pull-chain holes 113 on the two opposite sides of the sidewall are used to mount and secure the pull-chain assemblies 13, ensuring that when the user pulls the pull-chain downward, the force is entirely borne by the body of the lamp panel 11, thereby guaranteeing the structural strength. Additionally, compared to conventional pull-chain ceiling fan light structures, this integrated design of the controller 12, pull-chain assemblies 13, and lamp panel 11 eliminates the need for extra connections between two pull-chain wires and the lamp board wires. This simplifies installation, enhances overall structural strength, and avoids potential issues caused by excessive assembly or transportation impacts.

Figure 5:
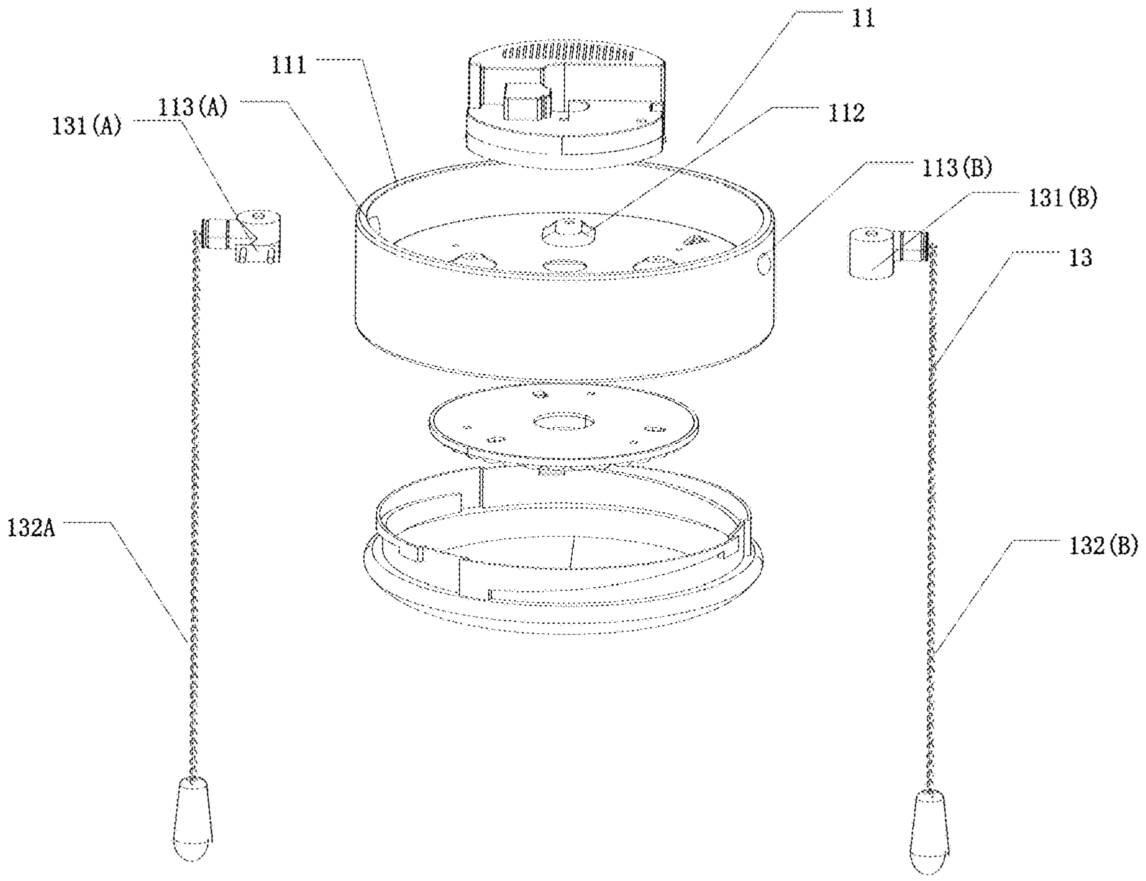
FIG. 5 is a schematic diagram showing a lamp panel structure according to an embodiment of the present disclosure.
Figure 6:
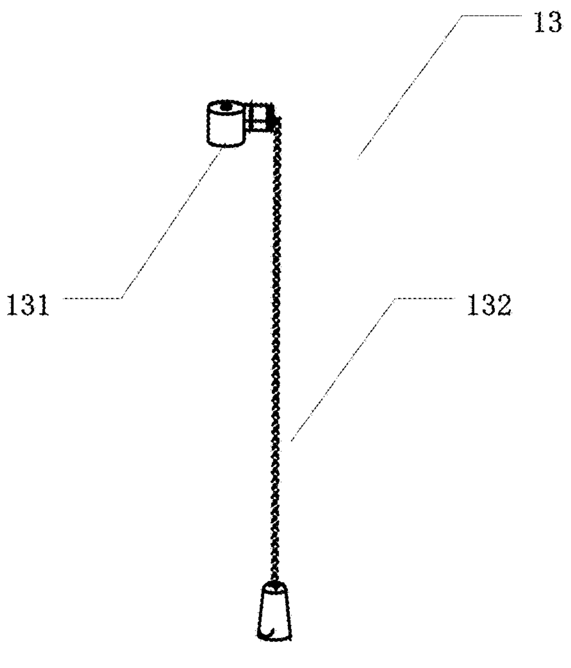
FIG. 6 is a schematic diagram showing a pull-chain assembly of a lamp panel structure according to an embodiment of the present disclosure.

Please refer to FIG. 5 and FIG. 6, which respectively show a schematic diagram of a lamp panel structure and a pull-chain assembly of a lamp panel structure according to an embodiment of the present disclosure.

In one embodiment, the controller 12 is fixedly mounted atop the lamp panel 11. A plurality of protrusions 112 are provided on the top of the lamp panel 11. The controller 12 is fixedly mounted atop the lamp panel 11 via the plurality of protrusions 112. The plurality of protrusions 112 are disposed on the same surface atop the lamp panel 11. A suspended space is formed between the bottom of the controller 12 and the top of the lamp panel 11 through the plurality of protrusions 112.

In this embodiment, three protrusions 112 are provided on the top of the lamp panel 11.

Specifically, the three protrusions 112 are evenly distributed on the top of the lamp panel 11, near the side where the controller 12 is installed. Positions of the plurality of protrusions 112 correspond to installation holes of the controller 12. The plurality of protrusions 112 are used to install the controller 12, either by snap-fit engagement or by securing the controller 12 to the plurality of protrusions 112 with screws. Thus, the three protrusions 112 on the lamp panel 11 allow the controller 12 to be firmly fixed atop the lamp panel 11 via screws. Additionally, the bottom of the controller 12 and the top of the lamp panel 11 form the suspended space through the plurality of protrusions 112, which is used to isolate the controller 12 from contact with the underlying lamp board 14. This effectively prevents heat exchange between the two heat sources (i.e., the controller 12 and the lamp board 14), ensuring that the controller 12 operates in a relatively stable thermal environment.

Meanwhile, the integrated structure of the controller 12 and the lamp panel 11 enhances signal strength, eliminating signal instability issues. The controller 12 is placed below and integrated with the lamp panel 11, which also facilitates easier maintenance and replacement while improving aesthetic appeal and user experience.

Please continue to refer to FIG. 5.

In one embodiment, the lamp board 14 is fixedly mounted below the lamp panel 11 through connecting pieces, and adheres to a lower surface of the lamp panel 11.

Specifically, the lamp board 14 can be secured to the lower surface of the lamp panel 11 by screws, ensuring robust fixation while allowing the entire aluminum substrate of the lamp board 14 to contact the lamp panel 11 for stability and efficient heat dissipation.

Please continue to refer to FIG. 5 and FIG. 6.

In one embodiment, each of the pull-chain assemblies 13 includes a pull-chain fastener 131 and a pull-chain 132. The number of the pull-chain fastener 131 matches the number of the pull-chain 132, with their positions corresponding one-to-one. The pull-chain fastener 131 is fixedly connected to the pull-chain hole 113 on the sidewall of the lamp panel 11. The pull-chains 132 in the pull-chain assemblies 13 pass through the sidewall structure 111 and connect to the controller 12, enabling the pull-chains 132 to separately control a light switch and a fan switch. At least two pull-chain assemblies 13 are provided.

In this embodiment, two pull-chain assemblies 13 are provided, that is, two pull-chain fasteners 131, two pull-chains 132, and two corresponding pull-chain holes 113 are provided.

Specifically, two pull-chain assemblies 13 are respectively provided on the corresponding sidewalls of the sidewall structure 111 of the lamp panel 11. The two pull-chain fasteners 131 are respectively fixedly disposed on the exterior side of the sidewall structure 111 and match the two pull-chain holes 113. Each pull-chain 132 passes through its respective pull-chain fastener 131 and the pull-chain hole 113, then connects to a control switch of the controller 12.

That is to say, a first pull-chain hole 113A is fixed to a first pull-chain fastener 131A. The first pull-chain 132A sequentially passes through the first pull-chain fastener 131A and first pull-chain hole 113A before connecting to the control switch of the controller 12 (which may control either the light or fan). Similarly, a second pull-chain hole 113B is fixed to a second pull-chain fastener 131B. The second pull-chain 132B passes through the second pull-chain fastener 131B and second pull-chain hole 113B before connecting to the controller's control switch (which may control either the light or fan). Here, the connection points of the two pull-chains 132A/132B need only correspond one-to-one with the controller's switches. This integrated pull-chain and lamp panel 11 structure eliminates wire entanglement issues. When operated, all pulling force is borne by the lamp panel 11 itself, ensuring structural integrity of the entire ceiling fan light.

Therefore, the controller 12 is configured with two independent control circuits that separately control the light source panel and the motor assembly, enabling remote control of both lighting functions (on/off switching and color temperature adjustment) and fan speed regulation through a wireless remote controller. The two pull-chains 132 separately control the light switch and the fan switch. The pull-chain assemblies 13 and controller 12 are pre-installed on the lamp panel 11, preventing damage or poor contact during shipping or customer installation. As a unified structure, installation requires only connecting live/neutral wires and motor cables to mount the entire lamp panel 11 beneath the motor assembly 2, significantly simplifying the process.

This integrated controller 12 and pull-chain assemblies 13 design prevents signal wire breakage while reducing signal wire length through co-location, thereby lowering costs.

In one embodiment, the lamp shade 15 is fixedly connected to the bottom of the lamp panel 11 through connecting pieces. During installation, the lamp shade 15 can be securely fastened to the lamp panel 11 through threaded rotation, enabling convenient assembly and disassembly. The lamp shade 15 is preferably made of PS (polystyrene), balancing strength and cost efficiency.

In one embodiment, preferably, the lamp panel 11 is made of a steel plate to meet both structural and thermal dissipation requirements.

As an example, the following is an installation process of the lamp panel structure and the ceiling fan light comprising the same.

Pull-chains were first secured to the exterior sidewall of the lamp panel through the pull-chain fasteners in the pull-chain assemblies. The holes of the pull-chain fastener match the pull-chain holes on the lamp panel sidewall.

The controller was then fixed to the three protrusions on the top of the lamp panel using screws, creating a suspended space between the bottom of the controller and the top of the lamp panel. This isolation prevented the controller from contacting the underlying lamp board and effectively blocked heat transfer between the two heat sources, maintaining a moderate operating environment for the controller components.

The lamp board was subsequently fixed to the lower side of the lamp panel with screws, achieving firm fixation while allowing full contact between the aluminum substrate of the lamp board and the lamp panel for stable and efficient heat dissipation.

The lamp shade was then fastened to the lamp panel via threaded rotation, enabling convenient assembly and disassembly. At this stage, the lamp panel structure assembly was completed.

Finally, the lamp panel structure was secured to the lower part of the motor assembly with screws, completing the integration of the motor assembly and lamp panel structure. The installation process was thus finished.

It can be concluded that the ceiling fan light with the lamp panel structure of the present disclosure adopts an integrated design incorporating the controller, pull-chains, and lamp panel. This configuration eliminates the need for additional connections between two pull-chain wires and lamp board wires, enabling convenient installation while providing high structural integrity. It effectively prevents various abnormal issues caused by excessive assembly components and transportation impacts, and extends the product's service life.

In summary, the present disclosure provides a lamp panel structure and a ceiling fan light comprising the same, achieving the following advantages through integrated design. The lamp panel structure features an integrated structure combining the pull-chains and lamp panel, which avoids wire entanglement issues. During user operation, the force is borne by the lamp panel, ensuring overall structural strength. The integration of the controller and pull-chains prevents abnormal issues such as signal wire breakage, while their co-location reduces signal wire length and saves costs. The integration of the controller and the lamp panel enhances signal strength, eliminates signal instability problems, and facilitates maintenance and replacement as the controller is mounted below as part of the integrated lamp panel structure. Therefore, this innovative approach not only solves the high failure rate problems of conventional ceiling fan lights, but also addresses safety concerns during installation, maintenance, and operation. Additionally, the structure and components of the ceiling fan light exhibit strong compatibility and broad applicability.

It should be understood that the examples and embodiments described herein are for illustrative purposes only and that various modifications or changes in light thereof will be suggested to persons skilled in the art and are to be included within the purview of this application. Such alterations, modifications, and improvements are intended to be part of this disclosure and are intended to be within the scope of the disclosure.

What is claimed is:

1. A lamp panel structure, comprising a lamp panel, pull-chain assemblies, a controller, a lamp board, and a lamp shade;

wherein the lamp panel is configured to fixedly mount the controller, the lamp board, and the lamp shade, respectively;

a sidewall structure is integrally formed upward along a periphery of the lamp panel;

wherein the sidewall structure is fixedly connected to the pull-chain assemblies;

the controller is fixedly mounted atop the lamp panel; and pull-chains of the pull-chain assemblies pass through the sidewall structure and connect to the controller, so that the pull-chains separately control a light switch and a fan switch;

wherein the lamp board, as a first heat source, is arranged on a bottom surface of the lamp panel, and a plurality of protrusions are disposed on a top surface of the lamp panel, wherein the controller, as a second heat source, is placed on and supported by the plurality of protrusions, and a suspended space is formed between a bottom of the controller and the top surface of the lamp panel, wherein the suspended space isolates the first heat source from the second heat source, and prevents heat exchange between the first heat source and the second heat source;

wherein the controller is fixedly mounted to a top of the lamp panel by engaging with the plurality of protrusions or by being fastened to the plurality of protrusions with screws;

wherein the lamp board is fixedly mounted below the lamp panel via connecting pieces and adheres to a lower surface of the lamp panel.

2. The lamp panel structure of claim 1, wherein at least one pull-chain hole is provided at an edge of the sidewall structure; and the pull-chain assemblies match the pull-chain hole and are fixedly disposed on an exterior side of the sidewall structure.

3. The lamp panel structure of claim 2, wherein at least two pull-chain holes are provided.

4. The lamp panel structure of claim 1, wherein the plurality of protrusions are all disposed on the same surface atop the lamp panel.

5. The lamp panel structure of claim 1, wherein the lamp shade is fixedly connected to a bottom of the lamp panel through connecting pieces.

6. The lamp panel structure of claim 1, wherein the lamp panel, the controller, and the pull-chain assemblies form an integrated structure.

7. A ceiling fan light, comprising the lamp panel structure of claim 1.

* * * * *